Figure 1:
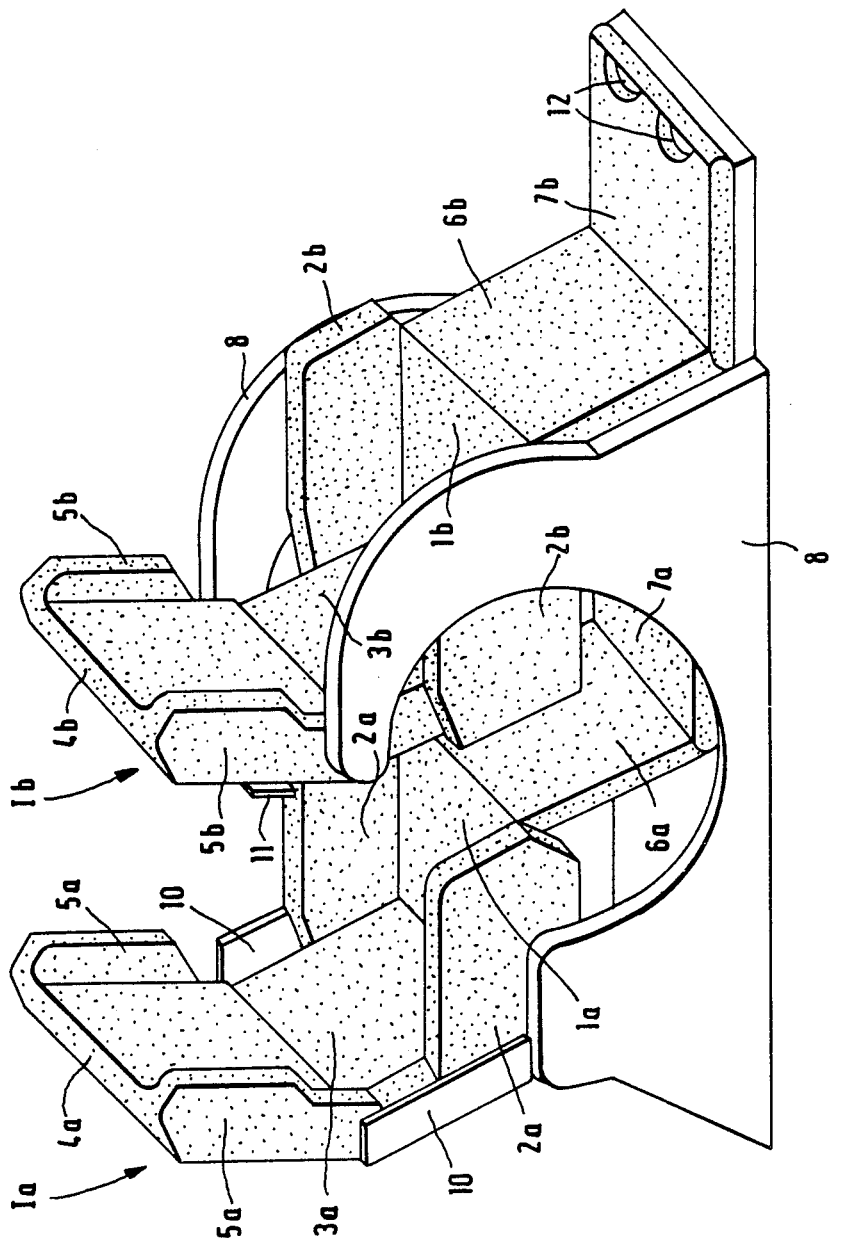

United States Patent [19]

Haefelfinger

[11] Patent Number: 4,735,456

[45] Date of Patent: Apr. 5, 1988

[54] DEVICE WITH AT LEAST TWO SEATS ARRANGED ONE BEHIND THE OTHER

[76] Inventor: Robert Haefelfinger, Hauptstrasse 60, CH-4450 Sissach, Switzerland

[21] Appl. No.: 942,455

[22] PCT Filed: Apr. 3, 1986

[86] PCT No.: PCT/CH86/00042

§ 371 Date: Nov. 20, 1986

§ 102(e) Date: Nov. 20, 1986

[87] PCT Pub. No.: WO86/05748

PCT Pub. Date: Oct. 9, 1986

[30] Foreign Application Priority Data

Apr. 3, 1985 [CH] Switzerland .................. 1460/85

[51] Int. Cl.[4] .............................................. B60N 1/10
[52] U.S. Cl. ............................................ 297/62; 5/9 R; 5/9 B; 297/63; 297/243
[58] Field of Search ............... 297/62, 63, 66, 67, 297/243; 105/345, 316, 317; 5/9 R, 9 B

[56] References Cited

U.S. PATENT DOCUMENTS 2,966,199 12/1960 Waerner .................... 297/62
4,440,439 3/1984 Szabo ..................... 297/243 X

FOREIGN PATENT DOCUMENTS 987559 4/1951 France ..................... 297/63

*Primary Examiner*—James T. McCall
*Attorney, Agent, or Firm*—Ladas & Parry

[57] ABSTRACT

Two seats (1a, 1b) are mounted on carrier components (15, 16) in such a way that by means of a swinging movement they can be brought from a seating position one behind the other to a lying position one above the other. Synchronously with the swinging movement in the lying position. The seats are completely stretched out in a horizontal position by means of adjustment mechanisms (54, 60a/b, 61a/b, 63a/b, 64a/b, 65a/b, 67a/b, 68b, 70b). The device is especially suited for use in transportation systems. In another embodiment instead of single seats (1a, 1b) rows with two or more seats next to each other may be provided.

10 Claims, 8 Drawing Sheets

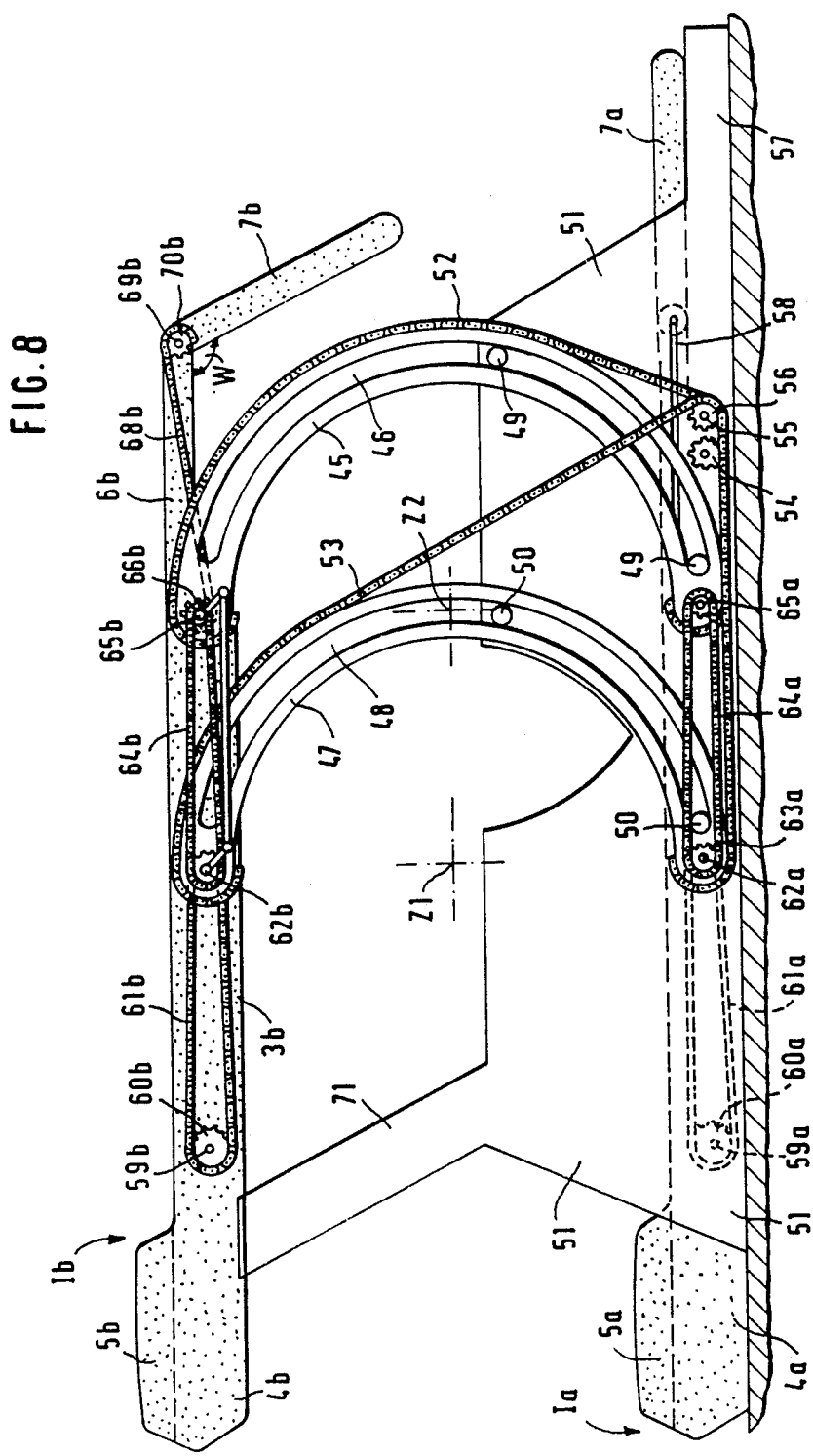

DEVICE WITH AT LEAST TWO SEATS ARRANGED ONE BEHIND THE OTHER

The design of the seats is of fundamental importance for the comfort of a means of transport. The comfort of the seats is one of the factors which governs whether a trip is pleasant or tiresome. On relatively long trips, especially at night, there is frequently a need for sleeping facilities. In vehicles with restricted space available, for example on buses, in railroad cars or aircraft, however, it is not possible to accommodate beds without high surcharges. To make possible, nevertheless, as comfortable a position as possible, in which even people of average sensitivity can sleep a little, the inclination of the backrests can often be adjusted individually. In the case of more luxurious seats, there are sometimes even leg elements, the inclination of which can likewise be adjusted individually. However, really good sleeping comfort is only provided when the seats can be completely extended, so that it is possible to assume not only a supine position but also a prone position and a position lying on one's side. In particular, while sleeping there is always a need to turn over and change one's position somewhat. But in the known seat arrangements, it is not possible, even in first-class compartments, to extend the seats completely horizontally.

The invention achieves the object of providing a device in which the seats can be completely extended, even when the space available is restricted.

According to the invention, this is achieved when two seats or seat rows arranged one behind the other can be brought into an extended position parallel to and one above the other by means of a pivoting extension mechanism. For this purpose, there can be drive means which make it possible to change position automatically. The design of the pivoting extension mechanism advantageously permits a person to remain seated during a change in position. This prevents a disturbance which would be caused if those passengers having to change position each had to leave their seat for this purpose.

Figure 2:
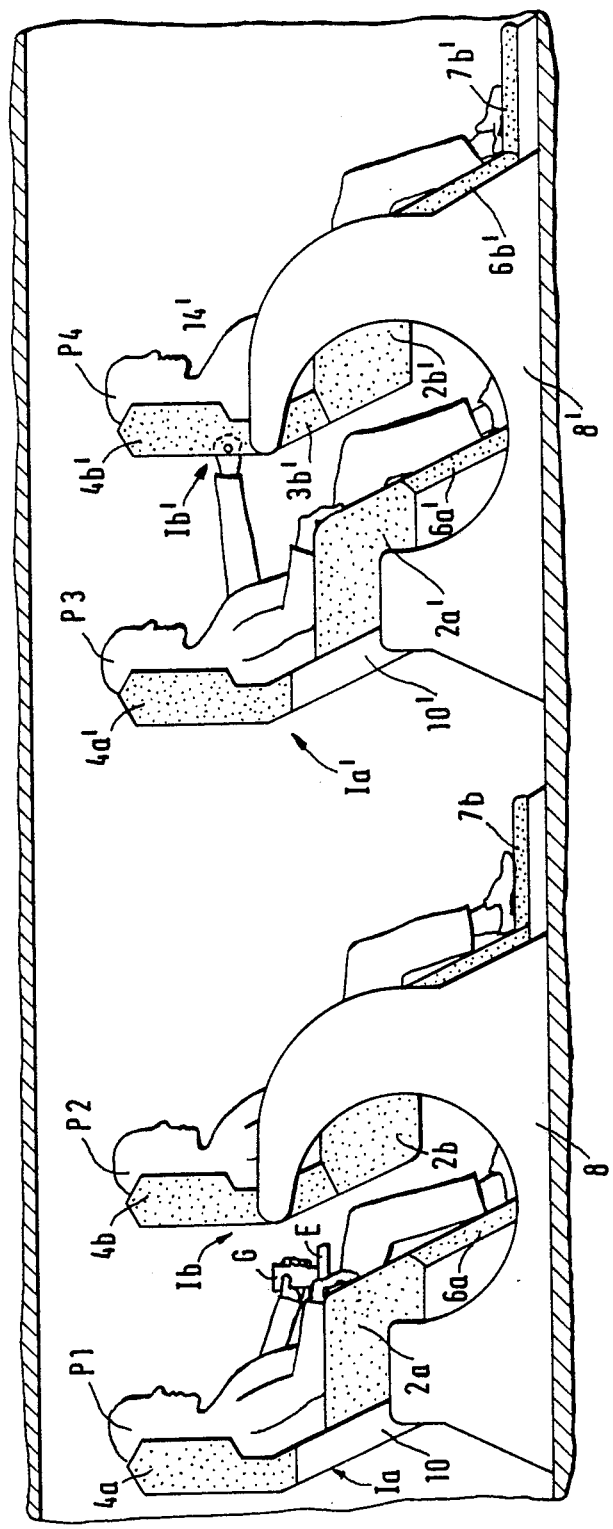
Figure 3:
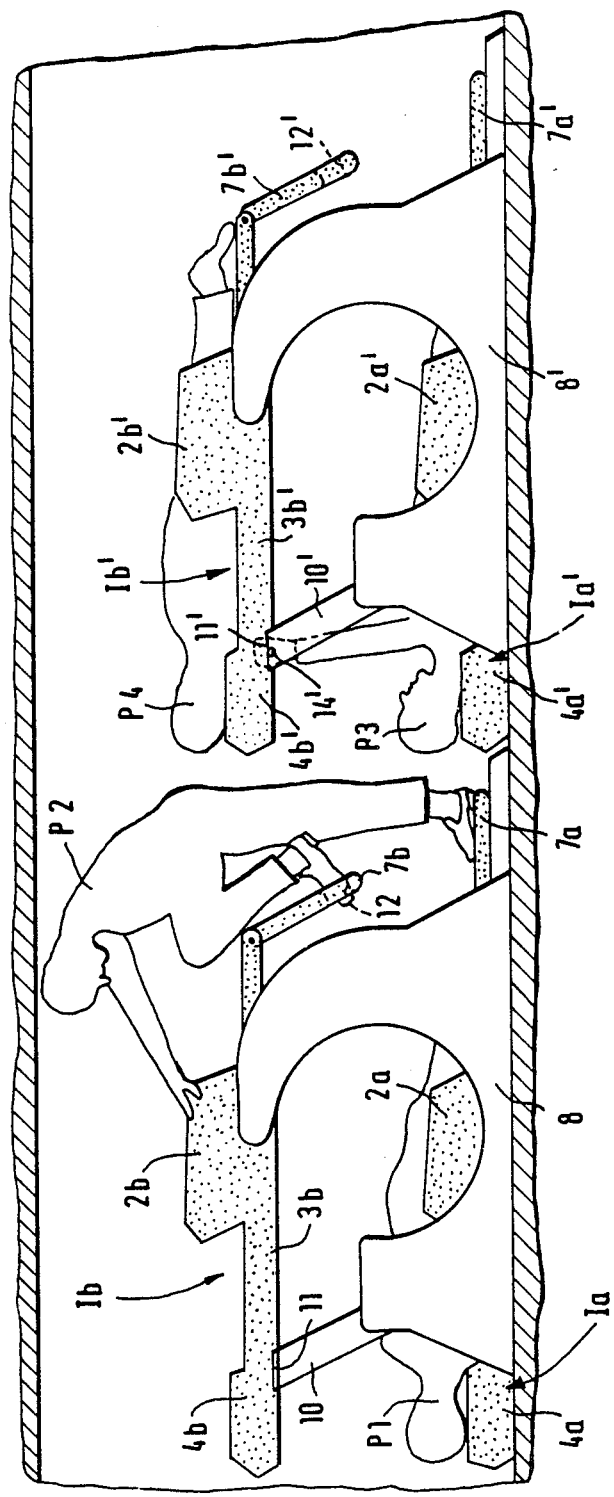
Figure 4:
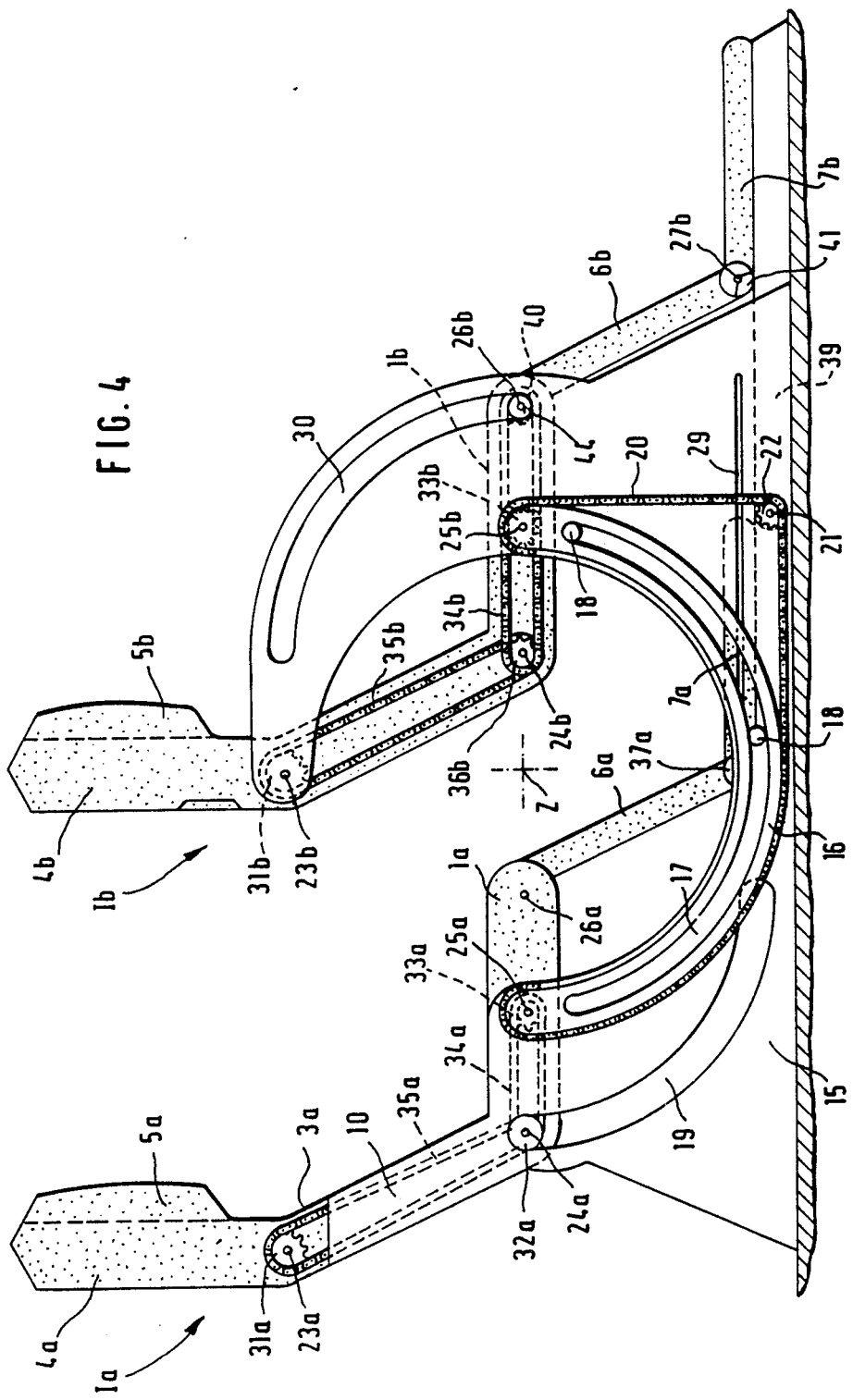
Figure 5:
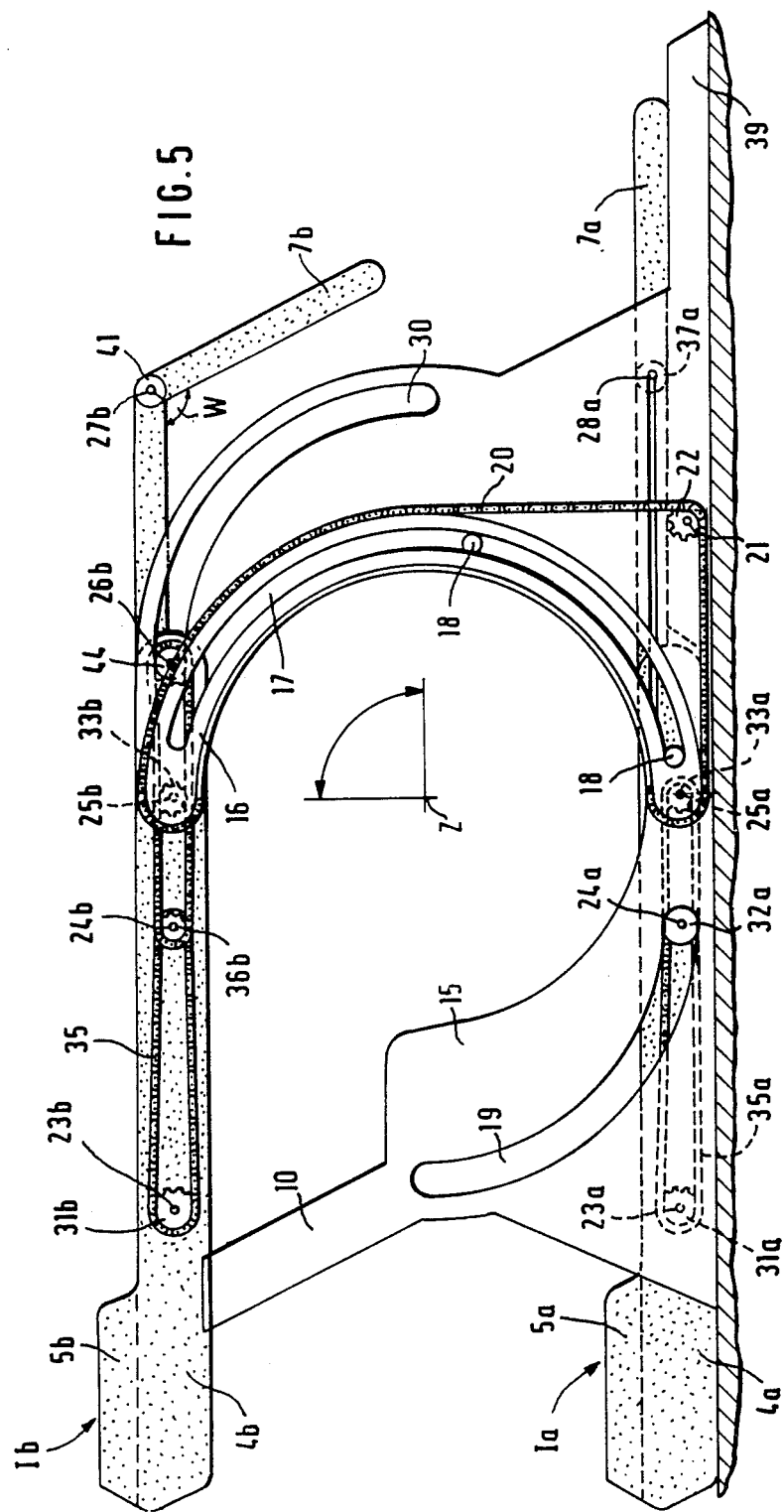
Figure 6:
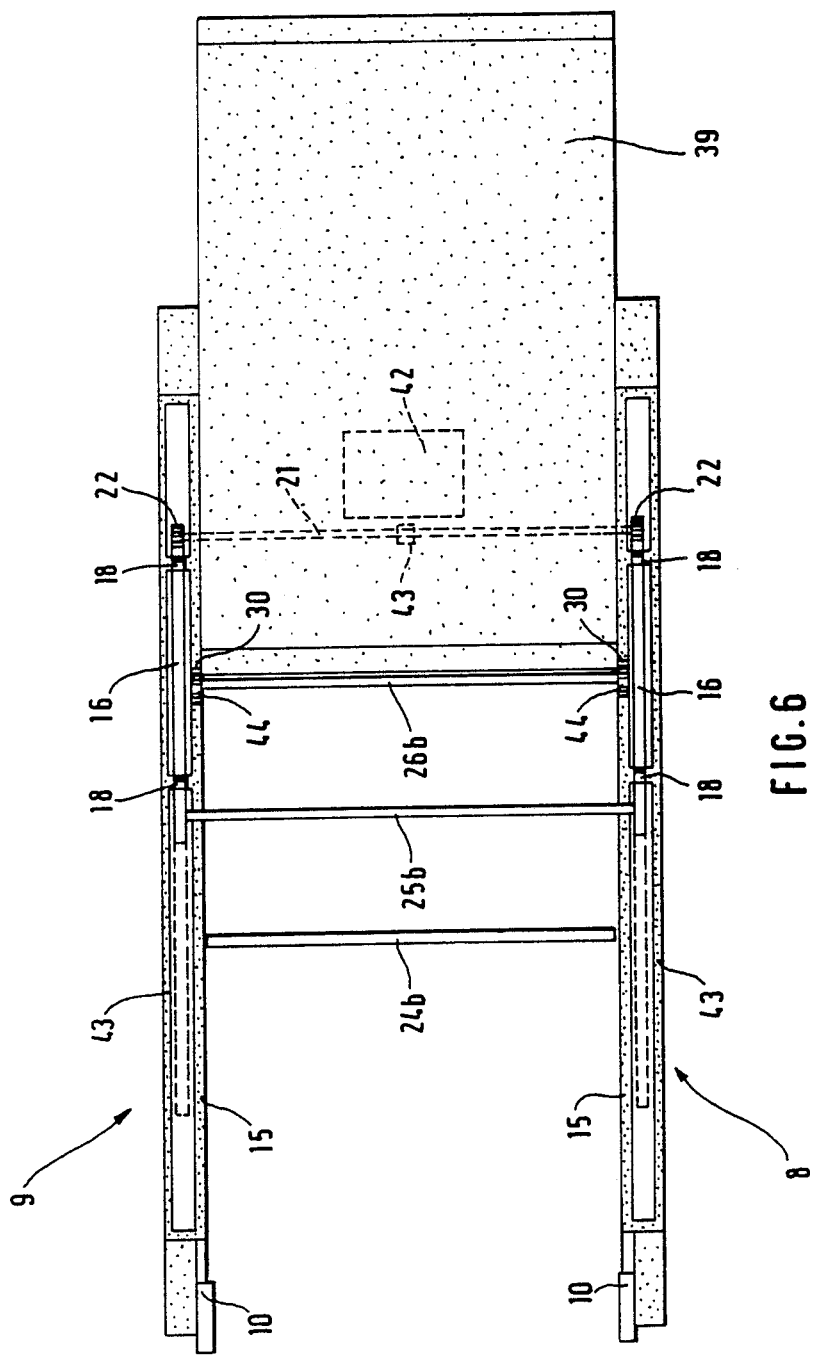
Figure 7:
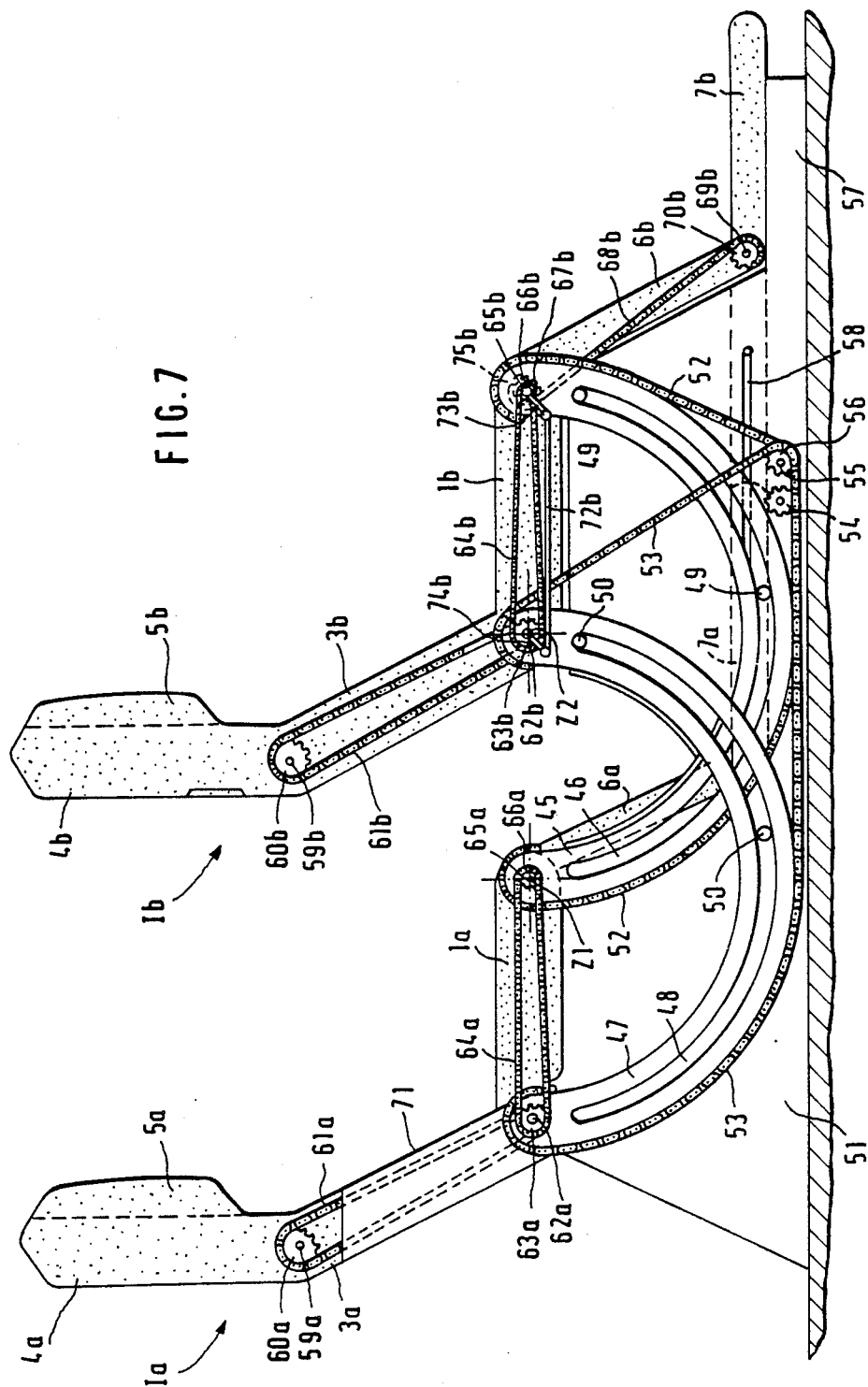

The invention is explained in detail below by way of example, with reference to a drawing in which:

FIG. 1 shows an axonometric view of a device according to the invention in the sitting position, FIG. 2 shows an illustrative side view of two devices arranged one behind the other, in the sitting position, FIG. 3 shows an illustrative side view of two devices arranged one behind the other, in the lying position, FIG. 4 shows a diagrammatic side view of a device in the sitting position, FIG. 5 shows a diagrammatic side view of a device in the lying position, FIG. 6 shows a plan view of a device in the lying position, FIG. 7 shows a diagrammatic side view of a further embodiment of the invention in the sitting position, FIG. 8 shows a diagrammatic side view of the further embodiment of the invention in the lying position.

For the sake of clarity, the seats in FIGS. 1 to 8 are provided with dots.

FIG. 1 shows an axonometric representation of a device according to the invention. Two seats Ia, Ib are arranged one behind the other on two carriers 8 provided laterally. Located in each of the carriers 8 is an adjusting mechanism which makes it possible to change position from the sitting position to the lying position and vice versa. Each seat Ia, Ib comprises a seat part or element 1a, 1b connected firmly to an arm rest 2a, 2b on both the left and the right. It is also composed of a back element 3a, 3b, a head element 4a, 4b, a leg element 6a, 6b and a foot element 7a, 7b. The head element 4a, 4b is connected firmly to lateral headrests 5a, 5b. A supporting element 11 is provided on each side on the head part 5b of the front seat, and by means of these the head element 5b of the front seat is supported, in the lying position on two stays 10 mounted on the carriers 8 on the left and right of the rear seat. In the foot element 7b of the front seat there are recesses 12 which serve to enable a person to climb onto or off the front seat Ib which is in the lying position.

FIG. 2, which illustrates two devices in the sitting position arranged one behind the other, shows persons P1, P2, P3 and P4 for greater clarity. The person P1 in the rear seat Ia of the rear device is just lifting a glass G off the small fitted table E. The small fitted tables E can be retracted into the armrest 2a/b, 2a'/2b' after use. The person P2 sits relaxed on the front seat Ib of the rear device. The person P3 on the rear seat Ia' of the front device holds on firmly to a handle 14' represented by a broken line. This is useful as a support when climbing into or leaving the rear seat Ia'. In the front device too the person P4 sitting on the front seat Ib' sits relaxed.

In FIG. 3, the four persons, P1, P2, P3 and P4 are moving around, once again in the devices arranged one behind the other. Here, however, the devices are shown in the lying position. The rear seat Ia of the rear devices has been converted into a bed resting on the floor. The front seat Ib of the rear devices now serves as an upper bed. Moreover, it can be seen clearly here how the supporting element 11 or 11' of the front seat Ib or Ib' rests on the stay 10 or 10' provided on the rear seat Ia or Ia'. The person P1 has assumed a resting position lying on his side, whilst the person P2 is just about to climb onto the upper bed. For this purpose, he inserts the tip of a foot into a recess 12 in the foot element 7b.

In the front device, the person P3 is in the supine position. He is holding firmly onto the handle 14' represented by a broken line. When the device is in this position, this handle 14' serves to help the person to raise himself again. The person P4 on top is lying in a comfortable prone position.

FIG. 4 shows a diagrammatic side view of a device according to the invention in the sitting position. The seat part 1a/b, the back and head elements 3a/b and 5a/b and the leg and foot elements 6a/b and 7a/b are adjustable in terms of their inclination relative to one another. For this purpose, there are pins 23a/b, 24a/b, 25a/b, 26a/b and 27b which connect the individual seat elements to one another in hinge-like manner. A carrier which has two carrier walls is provided on both the left and the right of the seats. However, only the inner carrier wall 15 of the carrier arranged on the right can be seen in the Figure.

The seat parts 1a/b are each connected on the left and right to C-shaped carrier element 16 via pins 17a/b provided in their central region. This carrier element 16 has a guide slot 17, in which it is mounted on two guide pins 18. These are fastened between the inner carrier wall 15 and the outer carrier wall (not shown). In order to pivot the seat parts 1a/b from the position one behind the other to the position one above the other, the C-shaped carrier element 16 executes a quarter turn about a center Z which is located in the middle of the connecting line between the two pins 17a/b. A drive means not shown in the Figure makes a drive shaft 21 execute a rotary movement. The adjustment of the C-shaped carrier element 16 is made via a chain 20 which is fastened to its ends and into which engages a gearwheel 22 provided on the drive shaft 21. An electric motor is considered primarily as a drive means. However, among other things, a hydraulic or pneumatic version or manual operation with a crank-handle is also conceivable.

So that the rear seat part 1a maintains its horizontal alignment during a pivoting movement, the rear pin 23a connecting the seat part 1a to the back element 3b is equipped with a guide wheel 24a which is guided in guide slot 19 provided in the inner carrier wall 15. This guide slot 19 has the form of a quarter circle of the same diameter as the C-shaped carrier element 16.

So that the front seat part 1b also maintains its horizontal alignment during a pivoting movement, the front pin 25b connecting the seat part 1b to the leg element 6b is guided, by means of a guide wheel 44, in a guide slot 30 likewise in the form of a quarter circle, which is provided in the inner carrier wall 15 and which has the same diameter as the C-shaped carrier element 16.

During a pivoting movement of the seat parts 1a/b from the sitting position to the lying position, the seats Ia/b are each extended completely. As regards the rear seat Ia, the extension movement is obtained by the following means:

Fastened to the rear end of the C-shaped carrier element 16 is a gearwheel 33a which, via a chain 34a, moves a gearwheel concealed in the Figure by the guide wheel 32. This gearwheel is connected firmly to the back element 3a via the pin 24a connecting the seat part 1a and the back element 3a in a hinge-like manner. During a quarter turn of the C-shaped carrier element 16, the gearwheel 33a connected to the latter also executes a quarter turn which is transmitted to the backrest 3a according to the transmission ratio of the two gearwheels. With allowance of the inclination of the backrest 3a in the sitting position, the transmission ratio is selected so that the backrest 3a is completely extended after the seat 1a has been adjusted into the lying position. A further gearwheel connected to the pin 24a moves, via a further chain 35a, a gearwheel 31a. The latter, via the pin 23a connecting the back element 3a and the head element 5a to one another, is connected firmly to the latter. The transmission ratio of the gearwheels is selected so that the head element 5a is aligned completely horizontally when the seat Ia is in the lying position.

The foot element 7a of the rear seat Ia rests partially on a platform 39 represented by a broken line. It is equipped with a rear pin which is concealed in the Figure by the C-shaped carrier element 16 and which connects the foot element 7a to the leg element 6a in a hinge-like manner. The pin is equipped on both sides with a wheel 37a and is additionally guided horizontally in a guide slot 29 provided in the inner carrier wall 15. During a pivoting movement of the rear seat Ia forwards and downwards, the foot element 7a is pushed horizontally forwards. The leg element 6a is likewise pushed forwards and at the same time swung down, so that, when the lying position is reached, it is aligned horizontally at the same height as the seat part 1a and the foot element 7a.

The front seat Ib possesses a chain system of a similar design to that of the rear seat Ia. As regards the adjustment of the back element 3b and head element 5b, what was said in respect of the rear seat Ia also applies accordingly to this. In contrast to the rear seat Ia, the gearwheel 33b attached to the front end of the C-shaped carrier element 16 is also connected to a further gearwheel 40 via the chain 34b. The transmission ratio of the gearwheels 33b, 40 is selected so that, when the lying position is reached, the leg element 6b is aligned horizontally. A locking element 41, the function of which is explained further below with reference to FIG. 5, is located on the pin 27b connecting the leg element 6b and the foot element 7b to one another in a hinge-like manner.

FIG. 5 illustrates the device in the lying position. The seat Ia which was previously at the rear is now at the bottom, extended into a bed, and the seat Ib which was at the front in the sitting position is now at the top, extended into a bed. The foot element 7b of the top bed Ib is drawn down as a result of gravity and is held at a specific angle W by means of a locking device 41. This angle is selected so that it is possible to climb onto the top bed Ib easily (see also FIG. 3 in this respect).

Because of the particular mode of representation, no carrier or adjusting elements present on the left-hand side of the seats Ia, Ib are visible in FIGS. 4 and 5. However, what was said regarding the elements arranged on the right-hand side also applies accordingly to these.

FIG. 6 shows a plan view of the frame of the device, with the seats in the lying position. Both carriers 8 can be seen in the Figure. They comprise an inner wall 15 and an outer wall 43. A stay 10 for supporting the head element of the front seat is attached to the rear of each of the two carriers 8. A platform 39 is located between the two carriers in the front region. This platform 39 serves for the horizontal bracing of the carriers 8. Furthermore, the drive means 42, for example an electric motor, is mounted in it. Finally, it serves as a rest for the foot element 7a of the rear seat Ia. The drive means 42, via a gearwheel 43, move the drive shaft 21 which is connected to the two gearwheels. Two guide pins 18, on which the C-shaped carrier elements 16 are guided, are located between the inner and outer carrier walls 15, 43. The Figure also shows the rear pin 24b, the pin 25b in the central region and the front pin 26b for the seat part of the front seat. The pin 25b for the central region of the seat part is connected to the C-shaped carrier elements 16. The front pin 26b slides, by means of the two guide wheels 44, in the guide slots 30 provided for the purpose in the inner carrier walls 15. The position of the C-shaped guide elements 16 when the seats are in the sitting position is indicated by broken lines.

FIG. 7 shows a diagrammatic side view of an alternative embodiment of the device according to the invention in the sitting position. Here again, the seat part 1a/b, the back and head elements 3a/b and 5a/b and the leg and foot elements 6a/b and 7a/b are adjustable in terms of their inclination relative to one another. For this purpose, there are pins 59a/b, 62a/b, 65a/b and 69b which connect to the individual seat elements to one another in a hinge-like manner. A carrier which has two carrier walls is provided on both the left and the right of the seats. However, only the inner carrier wall 51 of the carrier arranged on the right is visible in the Figure.

The seat parts 1a/b are connected to one another via their rear pins 62a/b, via a first C-shaped carrier element 47 and via their front pins 65a/b via a second C-shaped carrier element. The C-shaped carrier elements 45 and 47 each have a guide slot 46, 48, in which they are mounted and guided respectively on two guide pins 49, 50. These are fastened between the inner carrier wall 51 and the outer carrier wall (not shown). To pivot the seat parts 1a/b from the position one behind the other into the position one above the other, the C-shaped carrier elements 47, 45 each execute a quarter turn about a center $Z_1$ and a center $Z_2$ respectively. The center $Z_1$ is located in the middle of the connecting line between the two rear pins 62a/b, and the center $Z_2$ is located in the middle of the connecting line between the two front pins 65a/b. A drive means not shown in the Figure makes a drive shaft 55 execute a rotary movement. The adjustment of the first C-shaped carrier element 47 is carried out via a chain 53 fastened to its ends into which engages a gear-wheel 56 provided on the drive shaft 55. The second C-shaped carrier element 45 is adjusted via a chain 52 which is fastened to its ends and into which engages a gearwheel provided on the drive shaft 55, but not shown in the Figure. Once again, an electric motor is primarily suitable as a drive means. However, here too, it is also conceivable to have, among other things, a hydraulic or pneumatic version or manual operation with a crankhandle.

The two C-shaped carrier elements 45, 47 are arranged next to one another laterally relative to the seats. The common drive shaft 55 ensures a synchronous movement and consequently perfect parallel guidance of the seat parts 1a/b. In comparison with the alternative embodiment shown in FIGS. 1 to 6, the guide slots provided in the inner carrier wall both at the rear and at the front, which, to guarantee the horizontal alignment of the seat parts 1a/b, serve for guiding the rear pin in the rear seat part and the front pin in the front seat part, are omitted. This consequently does away with the upper part of the carrier wall projecting above the armrest of the front seat Ib.

During a pivoting movement of the seat parts 1a/b from the sitting position to the lying position, the seats Ia/b are each extended completely. Where the rear seat Ia is concerned, the extension movement is obtained by the following means:

A gearwheel 66a is fastened to the rear end of the second carrier element 45 which carries and guides the front pin 65a of the seat part 1a. This gearwheel 66a is connected to a further gearwheel 63a via a chain 64a. The further gearwheel 63a is connected to the rear pin 62a of the seat part 1a, the rear pin 62a being connected firmly to the back part 3a. During a quarter turn of the first C-shaped carrier element 45, the gearwheel 66a connected to the latter also executes a quarter turn which is transmitted to the backrest 3a according to the transmission ratio of the two gearwheels 66a, 63a. With allowance for the inclination of the backrest 3a in the sitting position, the transmission ratio is selected so that the backrest 3a is completely extended horizontally after the seat 1a has been adjusted into the lying position. A further gearwheel connected to the pin 62a, but not shown in the Figure moves, via a further chain 61a, a gearwheel 60a. This, via a pin 59a connecting the back element 3a and the head element 5a to one another, is connected firmly to the latter. The transmission ratio of the gearwheels is selected so that, when the seat Ia is in the lying position, the head element is aligned completely horizontally (see FIG. 8 in this respect).

The foot element 7a of the rear seat Ia partially rests on a platform 57 partially represented by broken lines. It is equipped with a rear pin which is concealed in the Figure by the second C-shaped carrier element 45 and which connects the foot element 7a to the leg element 6a in a hinge-like manner. The pin is equipped with a wheel not shown in the Figure, which is guided in guide slot 58 provided in the inner carrier wall 51. During a pivoting movement of the rear seat Ia forwards and downwards, the foot 7a is pushed horizontally forwards. The leg element 6a is likewise pushed forwards and at the same time swung down, so that, when the lying position is reached, it is aligned horizontally at the same height as the seat part 1a and the foot element 7a. So that the leg element 6a of the rear seat Ia reliably maintains the desired angle of inclination after a pivoting movement into the sitting position, there is a drive wheel 54 which additionally exerts an adjusting force on the foot element 7a in the horizontal direction. The drive wheel 54 can be designed as a gearwheel which engages into a rack not shown in the figure, fastened to the bottom of the foot element 7a.

The front seat Ib possesses a chain system divided in a similar way to that of the rear seat Ia. As regards the adjustment of the back element 3b and the head element 5b, what was said in respect of the rear seat Ia also applies accordingly to this. Here, the drive wheel is a gearwheel 66b which is mounted rotatably on the front pin 65b of the seat 1b and which is connected firmly to the front end of the second C-shaped carrier element 45. In contrast to the rear seat, in which the foot element 7a is guided horizontally by the platform 57 and the drive wheel 54 and at the same time ensures the adjustment of the leg element 6a, in the front seat Ib both the leg element 6b and the foot element 7b require other adjusting members. The front pin of the seat part 1b, which is mounted rotatably in the latter, is connected firmly to the leg part 6b. It is connected, via a crank 73b and a connecting rod 72b, to a further crank 74b. The latter is connected firmly to the rear pin 62b of the seat part 1b. During a rotary movement of this rear pin 62b which serves for adjusting the back element 3b, a rotary movement of the front pin 65b and consequently an adjustment of the leg element take place at the same time. Instead of this guard-rod system 72b, 73b, 74b, a solution, not shown in the Figure, with a chain and gearwheels would also be possible. In this, the rear and front pins 63b, 65b would have to be equipped with gearwheels and connected to one another via a chain, into which these gearwheels engage. The foot element 7b is adjusted by means of a chain 68b. This is fastened, at one end, to a gearwheel 75b connected firmly to the pin 65b and, at its other end, to a further gearwheel 70b. The last-mentioned gearwheel 70b is connected firmly to the pin 69b which is itself connected firmly to the foot element 7b. The chain 68b is guided crosswise, so that the gear wheels 75b and 70b rotate in opposite directions. The transmission ratio of the two gearwheels 75b, 70b is selected so that, when the leg element 6b is aligned horizontally, the foot element 7b is aligned downwards at a predetermined angle W (see FIG. 8).

In FIG. 8, the further alternative embodiment, shown in the sitting position according to FIG. 7 is illustrated in the lying position. The two C-shaped carrier elements 45, 47, starting from the sitting position according to FIG. 7, have executed a quarter turn in the clockwise direction, the seat Ia previously at the rear is now at the bottom extended into a bed, and the seat Ib at the front in the sitting position is at the top, extended into a bed. The foot element 7a of the top bed Ib has been set at a specific angle W by means of the chain drive 66b, 68b, 70b. This angle W is selected so that it is possible to climb onto the top bed Ib easily (see also FIG. 3 in this respect).

For the sake of greater clarity, no carrier or adjusting elements also present on the left-hand side of the seats Ia, Ib are shown in FIGS. 7 and 8. However, what was said regarding the elements arranged on the right-hand side also applies accordingly to these.

FIGS. 1 to 6 illustrate devices with single seats. However, instead of a single seat, seat rows with two or more seats next to one another can also be provided at the rear and at the front. In such an alternative embodiment, there can also be three or more carriers arranged next to one another.

A great advantage of the device according to the invention is that, despite the most effective possible utilization of space, the seats are easily accessible both in the sitting position and in the lying position. The passengers even when changing position, can remain in their seats and are always strapped in. The armrests 2a/b maintain their horizontal alignment even in a change of position. Consequently, articles placed on them can be left there for the entire trip and are always at hand.

What is claimed is:

1. A device with at least two seats arranged one behind the other in which each seat is composed at least of a seat part, a back element, a head element and a leg element, in which the seat parts are movable into a parallel position one above the other by means of reversible movements, wherein for each of the rear and front seat parts (1a/b) the movement is pivotally executed both horizontally and at the same time also vertically in the opposite direction, and wherein synchronously with the pivoting movement the back elements (3a/b), head elements (4a/b) and leg elements (6a/b), head elements (4a/b) and leg elements (6a/b) are adjusted from the sitting position one behind the other into an extended lying position one above the other.

2. A device having two seats, one behind the other, movable into a parallel position, one above the other, the device comprising:
   two seats, one behind the other, each seat comprising a seat, a back, a head and a leg element;
   seat element means for pivotally moving the seat elements at the same time, both horizontally and vertically, in opposite directions into a parallel position, one above the other; and
   synchronous means for adjusting the back, head and leg elements of each seat from a sitting position, when the seat elements are one behind the other, to an extended, lying position, when the seat elements are one above the other, synchronously with the pivotal movement of the seat element means.

3. A device as claimed in claim 1, wherein the seat parts (1a/b) are mounted on transversely arranged pins (25a/b, 62a/b, 65a/b), and wherein these pins each describe the arc of a quarter circle during a pivoting movement, the diameter of a circle being defined by the distance between the particular pins corresponding to one another (25a/b or 62a/b or 65a/b).

4. A device as claimed in claim 1, wherein the pins (25a/b) arranged transversely in the central region of the seat parts (1a/b) are fastened laterally to and guided at the ends of C-shaped carrier elements (16) which are guided by means of guide elements (18) so as to be rotatable through an angle of 90°, the center Z of the rotary movement being located in the middle of the connecting line between the said two pins (25a/b).

5. A device as claimed in claim 1, wherein the rear seat part (1a) is additionally mounted on a rear pin (24a) which is guided in first guide tracks (19), provided in the inner walls (15) of two laterally arranged carrier, in such a way that the rear seat part maintains its horizontal alignment during a pivoting movement, and wherein the front seat part (1b) of the front seat (Ib) is additionally mounted on a front pin (25b) which is guided in second guide tracks (30), provided in the inner walls (15) of two laterally arranged carriers (8), in such a way that the front seat part (1b) maintains its horizontal alignment during a pivoting movement.

6. A device as claimed in claim 1, wherein the seat parts (1a, 1b) are supported on transversely mounted front pins (65a/b) and rear pins (62a/b), wherein the two front pins (65a/b) are each fastened laterally to and guided at the ends of a front C-shaped carrier element (45) and the two rear pins (62a/b) are each fastened laterally to and guided at the ends of a rear C-shaped carrier element (47), and wherein the C shaped carrier elements (45, 47) are guided by means of guide elements (49, 50) so as to be rotatable through an angle of 90°, the center ($Z_1$) of the rotary movement of the rear C-shaped carrier elements (47) being located in the middle of the connecting line between the two front pins (65a/b), and the center ($Z_2$) of the rotary movement of the front C-shaped carrier elements (45) being located in the middle of the connecting line between the two rear pins (62a/b).

7. A device as claimed in claim 1, wherein the seat parts (1a/b), the back elements (3a/b), the head elements (4a/b), the leg elements (6a/b) and the foot elements (7a/b) are connected in a hinge-like manner by means of pins (23a/b, 24a/b, 26a/b, 27b) so as to be each adjustable at an angle relative to one another, and wherein there are adjusting members (33a/b, 34a/b, 35a/b, 31a/b, 40), by means of which the back elements (3a/b), head elements (4a/b), leg elements (6a/b) and foot elements (7a/b) can be extended horizontally in synchronism with the pivoting movement of the seat parts (1a/b).

8. A device as claimed in claim 7, wherein the adjusting member comprises gearwheels (31a/b, 36b, 33a/b, 40) and chains (34a/b, 35a/b).

9. A device as claimed in claim 1, wherein the foot element (7b) of the front seat is connected in a hinge-like manner to the leg element (6b) via a pin (27b), wherein there is a locking device (41), by means of which the foot element (7b) is held at a predetermined angle (W) when the leg element (6b) is aligned horizontally, and wherein there are in the foot element (7b) recesses (12) which serve to permit climbing onto the extended top seat in the lying position.

10. A device as claimed in claim 1, wherein at least two seats are arranged next to one another both at the rear and at the front.

* * * * *